United States Patent

[11] 3,602,998

[72] Inventors Keikichi Imai;
　　　　　　　Sakuzo Matsumoto, both of Tokyo, Japan
[21] Appl. No. 780,688
[22] Filed Dec. 3, 1968
[45] Patented Sept. 7, 1971
[73] Assignee Olympus Optical Company, Ltd.
　　　　　　　Tokyo, Japan

[54] MICROMETER HEAD
　　　4 Claims, 7 Drawing Figs.
[52] U.S. Cl. ...................................................... 33/170,
　　　　　　　　　　　　　　　　　　　　　　　　　　　　33/166
[51] Int. Cl. ...................................................... G01b 3/18
[50] Field of Search ........................................... 33/163,
　　　　　　　　　　　　　　　　　　166, 170, 164, 165, 167

[56] References Cited
UNITED STATES PATENTS
3,049,807　8/1962　Smeets ........................ 33/166

Primary Examiner—William D. Martin, Jr.
Assistant Examiner—Charles E. Phillips
Attorney—Otto John Munz ABSTRACT: A micrometer head capable of adjusting the starting zero point of the graduations for a measurement. A graduated ring is manually rotatable relative to a thimble for the zero adjustment of the graduations at any axial position of the spindle. An indicating ring is rotatably mounted in the micrometer head and bears thereon graduations. The indicating ring is so coupled operatively with the spindle by guide means that the indicating ring is rotatably moved by one pitch of the graduations thereon as the spindle is rotated by one revolution. The indicating ring is further manually rotatable relative to the micrometer head regardless of the axial position of the spindle so that the zero adjustment of the graduations on the indicating ring is effected at any axial position of the spindle while the indicating ring is rotatably moved in conjunction with the rotation of the spindle during the normal measuring operation of the micrometer head.

PATENTED SEP 7 1971 3,602,998

INVENTOR
Keikichi Imai, Sakuzo Matsumoto
BY
Otto John Munz
ATTORNEY

INVENTOR
Keikichi Imai, Sakuzo Matsumoto
BY
ATTORNEY

MICROMETER HEAD

BACKGROUND OF THE INVENTION

The present invention relates to a micrometer head and, more particularly, to a micrometer head capable of adjusting the zero point for the measurement at any axial position of the measuring spindle of the micrometer head.

The present invention is particularly useful when used in a measuring instrument such as a tool microscope, a contour projector and the like for precisely measuring the small dimensions of portions in an object located on the stage of the measuring instrument.

In the measurement of the dimensions of an object by using a micrometer head of the type described above, the measurement is facilitated by adjusting the zero point of the graduations for the measuring so that the starting point in the object from which the measurement of the dimension is to be commenced is made in coincidence with the zero point of the graduations thereby making it unnecessary to effect subtractive calculation between the measured values obtained from the starting point and the final point in the object the distance between which is to be measured.

To this end, as disclosed in Japanese Pat. Pub. No. 29688/64, a separate graduated ring bearing thereon graduations for the measurement of fractions of one revolution of the spindle and, hence, fractions of the lead of the thread thereof by which the spindle is axially moved as a result of the rotation thereof is rotatably engaged with the thimble of the micrometer head by means of a screw thread provided in the graduated ring and having the same lead of the thread as that of the thread of the measuring spindle, which screw thread is rotatably fitted with the mating screw thread provided in the thimble, so that the zero point of the graduations for the measurement of fractions of the lead of the spindle by which the spindle is axially moved by the rotation thereof is brought into a position with respect to the reference index cooperating therewith corresponding to the starting point in the object from which the measurement is to be commenced while the spindle is held stationarily. In this case, the axial position of the graduated ring is also adjusted relative to the thimble so that the measurement of the axial movement of the spindle in terms of the multiple of the revolution thereof i.e., multiple of the lead of the thread of the spindle by using longitudinal graduations provided in the micrometer head is not adversely affected.

In such a micrometer head described above, however, the above-described zero adjustment is limited only in one of the two opposite directions of the rotation of the graduated ring, i.e., in the direction in which the graduated ring is threaded off the thimble, because the graduated ring cannot be threaded into the thimble beyond the position at which the inner end of the graduated ring abuts against the thimble. This is in effect inconvenient in the actual measurement by the micrometer head.

The present invention aims at avoiding the disadvantages of the prior art as described above and providing a novel and useful micrometer head capable of effecting zero adjustment in either of the two opposite directions at any axial position of the measuring spindle.

SUMMARY OF THE INVENTION

One object of the present invention is to provide a novel and useful micrometer head capable of effecting zero adjustment of the graduations for the measurement of fractions of the rotation of the spindle by which the spindle is rotated and, hence, fractions of the lead of the thread of the spindle in either sense of the two opposite directions of the axial movement of the spindle.

Another object of the present invention is to provide a novel and useful micrometer head of the type described above in which not only the zero adjustment of the graduations for the measurement of fractions of the lead of the thread of the spindle but also the zero adjustment of the graduations for the measurement of the axial movement of the spindle in terms of multiple of the revolution of the spindle i.e., multiple of the lead of the thread thereof by which the spindle is moved is effected in either sense of the two opposite directions at any axial position of the spindle.

Further object of the present invention is to provide a novel and useful micrometer head of the type described above in which two series of the successive numerals are arranged along the graduations for the measurement of fractions of the lead of the thread of the spindle in opposite directions to each other for facilitating the reading of the graduations in either of the two directions while two series of the successive numerals are arranged along the graduations for the measurement of the axial movement of the spindle in terms of multiple of the lead of the thread thereof in opposite directions to each other for facilitating the reading of the graduations in either of the two directions of the movement of the spindle.

Still further object of the present invention is to provide a novel and useful micrometer head of the type described above in which two vernier scales are provided at each of the reference indexes cooperating with the graduations for the measurement of fraction of the lead of the thread of the spindle and the graduations for the measurement of multiple of the lead in opposite directions to each other for assisting in obtaining precise reading of the measured value in either of the two directions of the movement of the spindle.

These objects are achieved in accordance with the present invention by providing a micrometer head having a threaded measuring spindle secured to a thimble and rotatably threaded in a sleeve held fixedly to the micrometer head so as to detect the axial movement of the spindle by the rotative movement thereof, a graduated ring rotatable together with the thimble relative to the sleeve and bearing circumferential graduations having a starting zero point thereof on the peripheral surface of the graduated ring for indicating the rotative position of the spindle in terms of fractions of one revolution thereof and, hence, in terms of the fractions of the lead of the thread of the spindle in cooperation with a reference index provided in the micrometer head rotatively fixed with respect to said sleeve, the graduated ring being mounted on the thimble rotatable relative thereto so as to permit the zero adjustment of the starting zero point of the graduations on the graduated ring with respect to the reference index to be effected at any axial position of the spindle in either sense of the two directions of the axial movement of the spindle while the graduated ring is rotatable together with the thimble during the normal measuring operation of the micrometer head, an indicating ring being provided on the sleeve relatively rotatable with respect thereto and having thereon circumferential graduations having a starting zero point thereof cooperating with a reference index held rotationally fixedly with respect to the sleeve, the indicating ring being operatively coupled with the spindle such that the former is rotatively moved by one pitch of the graduations thereon during one complete revolution of the spindle thereby permitting the axial movement by the lead of the thread of the spindle by virtue of one revolution thereof to be indicated by the rotative movement of the indicating ring by one pitch of the graduations thereon, the indicating ring being further manually rotatable relative to the sleeve while the spindle is held stationarily with respect to the sleeve thereby permitting the zero adjustment of the starting zero point of the graduations on the indicating ring with respect to the reference index cooperating therewith to be effected at any axial position of the spindle in either sense of the two directions of the axial movement of the spindle while the indicating ring is rotatable in coupled relationship with the rotational movement and, hence, the axial movement of the spindle during the normal measuring operation of the micrometer head.

In accordance with another feature of the present invention, first and second series of successive numerals are provided circumferentially on the graduated ring in opposite senses to each other along the graduations on the graduated ring with the zero of said numerals located in coincidence with the starting zero point of the graduations for facilitating the reading thereof in either of the two directions of the rotation of the spindle, the first series of the successive numerals being expressed differently from the second series so as to permit the first series to be distinguished from the second series, another first and second series of successive numerals being provided circumferentially on the indicating ring in opposite senses to each other along the graduations on the indicating ring with the zero of the numerals located in coincidence with the starting zero point of the graduations on the indicating ring, the first and second series on the indicating ring being designated by the expressions similar to those of the first and second series on the graduated ring, respectively, and directed in the senses corresponding to those of the first and second series on the graduated ring as they are moved rotatively as a result of the rotation of the spindle in either of the two directions, thereby facilitating the reading of the graduations on the indicating ring in connection with the reading of the graduations on the graduated ring during the measurement by the micrometer head.

In this case, the indicating ring may be rotatively moved in the same sense as that of the rotation of the spindle as a result of the rotation thereof, and the first and second series of the successive numerals on the indicating ring are directed in the same senses as those of the first and second series on the graduated ring, respectively, for preventing the misreading of the graduations.

In accordance with further feature of the present invention, the graduated ring is rotatably mounted on the thimble while the axial movement thereof is restrained, the reference index cooperating with the graduations on the graduated ring being provided on a thrust ring axially movably mounted on the sleeve while the rotative movement thereof relative to the sleeve is restrained, the thrust ring being so coupled with the thimble by engaging means provided therebetween that the former is axially moved together with the latter while the relative rotative movement therebetween is permitted, and intermediate ring being relatively rotatably interposed between the indicating ring and the sleeve and engaged with the thrust ring by engaging means provided therebetween so that the intermediate ring is moved axially together with the thrust ring while the relative rotative movement between the intermediate ring and the thrust ring is permitted, the intermediate ring being so coupled with the thrust ring by guide means provided therebetween that the former supporting thereon the indicating ring is rotatively moved by one pitch of the graduations on the indicating ring in response to one complete revolution of the spindle and, hence, to the axial movement of the spindle by the lead of the thread thereof thereby permitting the indicating ring supported on the intermediate ring to be rotatively moved by one pitch of the graduations thereon so as to indicate the axial movement of the spindle by the lead of the thread thereof, the indicating ring being manually rotatable relative to the intermediate ring for the zero adjustment of the starting zero point of the graduations on the indicating ring with respect to the reference index cooperating therewith which is provided on the thrust ring while the indicating ring is rotatively moved together with the intermediate ring during the normal measuring operation of the micrometer. Two vernier scales may be provided on the thrust ring in opposite senses to each other in parallel to the graduations on the graduated ring in facing relationship thereto with the zero point of each of the two vernier scales being positioned in coincidence with the reference index cooperating with the graduations on the graduated ring.

In accordance with still further feature of the present invention, an annular cover plate is secured around the peripheral surface of the thrust ring with a cutout window formed therein so as to expose the reference index on the thrust ring as well as the graduations on the graduated ring, the peripheral edge of the annular cover plate bearing thereon a further reference index at an rotative position corresponding to those on the thrust ring, further graduations corresponding to the graduations on the thrust ring being provided on the peripheral surface of the thrust ring at positions along the peripheral edge of the annular cover plate so as to cooperate with the above described further reference index on the annular cover plate, the first series of the numerals on the thrust ring being arranged along the graduations facing to the reference index on the thrust ring while the second series of the numerals on the graduated ring being arranged along the above described further graduations facing to the above-described further reference index on the annular cover plate thereby permitting the selective reading of the series of the numerals to be facilitated for the measurement in either sense of the two directions of the movement of the spindle by which the same has been moved from the starting zero point. In this case, a vernier scale is provided at the reference index cooperating with the graduations on the graduated ring, while another vernier scale is provided at the further reference index cooperating with the further graduations on the graduated ring, the above described another vernier scale being directed on the opposite sense to the above described one vernier scale.

As described above, the micrometer head constructed in accordance with the present invention makes it possible to effect zero adjustment of the starting point of the measurement in either of the two opposite directions at any axial position of the spindle while the reading of the graduations is made easy by the provision of two series of successive numerals directed oppositely to each other on the graduated ring as well as on the indicating ring for reading the respective graduations in either of the two directions depending upon the sense of the rotation of the spindle.

BRIEF DESCRIPTION OF THE DRAWING:

FIG. 1 is a cross-sectional view showing the micrometer head constructed in accordance with the present invention;

FIG. 2 is a side view of FIG. 1 showing the arrangement of the graduations as well as the reference indexes cooperating therewith for indicating fractions of the lead of the thread of the measuring spindle as well as multiple of the lead of the thread as the spindle rotates by the aid of two series of successive numerals arranged in opposite directions to each other, one of the series of the numerals being shown as being upright style letters while the other of the series are shown as being inclined style letters;

DETAILED DESCRIPTION OF THE PREFERRED EMBODIMENTS

Figure 3:
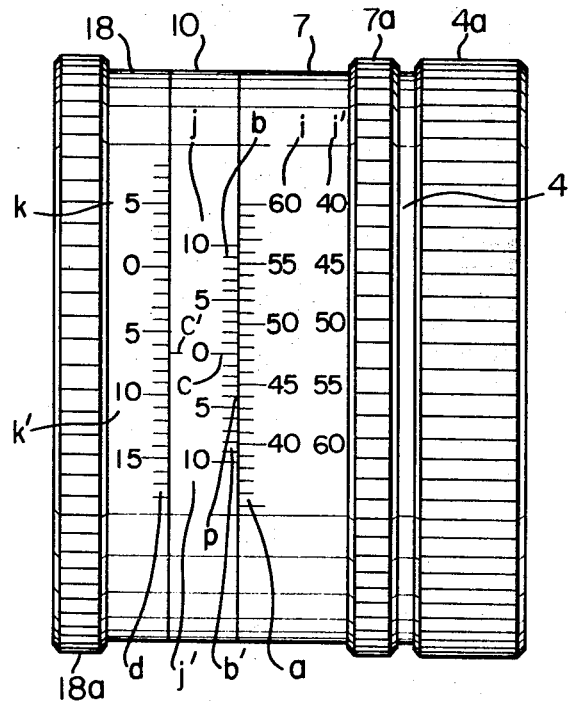
FIGS. 3 and 4 show examples of reading the graduations of the micrometer head of the present invention.

In FIG. 1 illustrating a preferred embodiment of the present invention, a measuring spindle 1 is provided with a flange portion 1a and a reduced diameter threaded portion 1b at its one end while a measuring feeler portion 1c is provided at its opposite end. The reduced diameter threaded portion 1b is fitted in a central hole of a base member 2 and fixed thereto by means of a nut 3 threaded on the reduced diameter threaded portion 1b as shown, the flange portion 1a serving to properly position the spindle 1 with respect to the base member 2. The spindle 1 is formed on the peripheral surface thereof with a lead screw thread. The base member 2 is fixedly secured to a cylindrical thimble 4 by means of the thread 2', for example, such that the thimble 4 is held in coaxial relationship to the spindle 1. The thimble 4 is provided on the peripheral surface thereof with annular knurled portion 4a for facilitating the manual rotation of the thimble 4.

A threaded sleeve portion 5 is provided in the micrometer which is fixed to a stationary point to which the micrometer head is attached and a sleeve 6 is secured to the sleeve portion 5 by means of machine screws (not shown) so that the sleeve 6 is held in coaxial relationship to the sleeve portion 5.

The spindle 1 is rotatably threaded in the sleeve portion 5 so that the sleeve 6 is concentrically located in the thimble 4 with sufficient annular clearance provided between the inner cylindrical surface of the thimble 4 and the outer cylindrical surface of the sleeve 6.

An annular graduated ring 7 is rotatably fitted on the outer peripheral surface of the thimble 4 as shown. The thimble 4 is provided with a circumferential groove 4b in the outer peripheral surface of the thimble 4 at a position underlying the graduated ring 7 and a split ring 8 is snugly fitted in the circumferential groove 4b so that the split ring 8 is rotatable relative to the thimble 4 but prohibited its axial movement relative to the same. Machine screws 9 are threaded into the split ring 8 through holes provided in the graduated ring 7 so that the latter is rotatable relative to the thimble 4 together with the split ring 8 while the axial movement of the graduated ring 7 relative to the thimble 4 is restrained. The fitting of the split ring 8 with the annular groove 4b is so adjusted that the graduated ring 7 is manually rotated relative to the thimble 4 while the former is rotated together with the latter during the normal measuring operation of the micrometer head.

In like manner as the thimble 4, the graduated ring 7 is provided on its peripheral surface with an annular knurled portion 7a for facilitating the manual rotation of the graduated ring 7.

A thrust ring 10 is slidably fitted on the sleeve 6 and provided with cylindrical flange portions 10a, 10b at axially opposite sides thereof, respectively. A screw 11 is threaded into the thrust ring 10 as shown, and the inner end 11a of the screw 11 is snugly fitted in the axial groove 6a provided in the outer peripheral surface of the sleeve 6, so that the thrust ring 10 is axially slidable with respect to the sleeve 6 while the rotational movement of the thrust ring 10 with respect to the sleeve 6 is restrained.

An annular raised portion 4c is provided on the inner peripheral surface of the thimble 4 adjacent to the end thereof facing to the thrust ring 10. A retainer ring 12 is threaded on the end of the cylindrical flange portion 10a which extends into the thimble 4, and a plurality of balls 13 are arranged in the annular clearances between the thrust ring 10 and the annular raised portion 4c and between the annular raised portion 4c and the retainer ring 12, respectively, as shown, so that the thrust ring 10 is moved axially together with the thimble 4 while the rotative movement of the thimble 4 relative to the thrust ring 10 is permitted. Thus, the end edge of the graduated ring 7 is located in facing relationship to the side of the thrust ring 10 opposing thereto.

An intermediate ring 14 is rotatably and axially movably fitted on the sleeve 6 at the side of the thrust ring 10 remote from the thimble 4. The intermediate ring 14 is provided with an annular cutout portion 14a in which the cylindrical flange portion 10b of the thrust ring 10 is fitted.

In like manner as the split ring 8 fitted in the annular groove 4b of the thimble 4, a split ring 15 is rotatably fitted in an annular groove 10c formed in the cylindrical flange portion 10b of the thrust ring 10, and machine screws 16 are threaded into the split ring 15 through holes provided in the intermediate ring 14 as shown, so that the intermediate ring 14 is rotatable relative to the thrust ring 10 while the intermediate ring 14 is moved axially together with the thrust ring 10 by virtue of the rotatable engagement of the split ring 15 secured to the intermediate ring 14 with the annular groove 10c of the thrust ring 10.

The sleeve 6 is provided with a helical groove 6b in the peripheral surface thereof, and a pin 17 secured to the inner peripheral surface of the intermediate ring 14 is slidably fitted in the helical groove 6b so that the intermediate ring 14 is rotatively moved by a certain amount along the helix defined by the helical groove 6b as described in detail hereinbelow as the intermediate ring 14 is moved axially.

An indicating ring 18 is rotatably mounted on the intermediate ring 14 and the axial movement thereof relative to the intermediate ring 14 is restrained by the rotatable engagement of a split ring 19 secured to the indicating ring 18 by means of machine screws 20 with an annular groove 14b provided in the peripheral surface of the intermediate ring 14 in like manner as the engagement of the split ring 8 with the annular groove 4b of the thimble 4.

The fitting of the split ring 19 with the annular groove 14b is so adjusted that the indicating ring 18 is manually rotatable relative to the intermediate ring 14 while the former is rotated together with the latter during the normal measuring operation of the micrometer head. In like manner as the graduated ring 7, the indicating ring 18 is provided on its peripheral surface with a peripheral knurled portion 18a for facilitating the manual rotation of the indicating ring 18.

Thus, when the measuring spindle 1 is rotated relative to the sleeve 6 in either of the two directions, the thimble 4 supporting thereon the graduated ring 7 is axially moved in either of the two directions depending upon the sense of the rotation of the spindle 1 as they are rotated together with the spindle 1. The thrust ring 10 is also moved axially together with the thimble 4 by virtue of the engagement of the annular raised portion 4c of the thimble 4 with the thrust ring 10 and the retainer ring 12 through the balls 13 arranged in the annular clearances formed between the thrust ring 10 and the raised portion 4c and between the raised portion 4c and the retainer ring 12 while the rotative movement of the thrust ring 10 is restrained by virtue of the slidable engagement of the end 11a of the machine screw 11 fixed to the thrust ring 10 with the axial groove 6a of the sleeve 6.

In like manner, the intermediate ring 14 supporting thereon the indicating ring 18 is moved axially together with the thrust ring 10 by means of the split ring 15 secured to the intermediate ring 14 and fitted in the annular groove 10c of the thrust ring 10. As described previously, the intermediate ring 14 is rotated by a certain amount as it is axially moved by virtue of the engagement of the pin 17 secured to the intermediate ring 14 with the helical groove 6b formed in the peripheral surface of the sleeve 6. As shown in FIG. 1, the peripheral surfaces of the graduated ring 7, the thrust ring 10 and the indicating ring 18 are flush with each other so as to facilitate the reading of graduations thereon as described hereinbelow.

As shown in FIG. 2, the graduated ring 7 is provided on its peripheral surface with graduations $a$ having a starting zero point which cooperate with a reference index $c$ provided on the peripheral surface of the thrust ring 10. The pitch of the graduations $a$ is so determined that a fraction of one revolution of the spindle 1, for example, 1/100 of one revolution in the embodiment shown, is indicated by the rotation of the graduated ring 7 by one pitch of the graduations $a$. In other words, the rotation of the graduated ring 7 together with the thimble 4 by one pitch of the graduations $a$ indicates that the spindle 1 is axially moved by that fraction of the lead of the lead screw thread of the spindle 1, thus, in the embodiment shown, by 1/100 of the lead of the lead screw thread.

Two series of successive numerals $i$, $i'$ are provided along the graduations $a$ in opposite directions to each other starting at the zero point for facilitating the reading of the graduations $a$ in either sense of the two rotational directions. The style of the numerals $i$ may be made different from that of the numerals $i'$. In the embodiment shown, both the numerals $i$ $i'$ are expressed by the upright letters but either of the numerals $i$, $i'$ may be made the inclined letters. However, the numerals $i'$ may be expressed by a different color than that of the numerals $i$ while the style of the letters is made the same with each other.

Two sets of vernier scales $b, b'$ well known in the art may be provided on the thrust ring 10 directed oppositely to each other from the reference index $c$ as shown for assisting the precise reading of the graduations $a$.

Two series of numerals $j, j'$ are arranged along the vernier scales $b, b'$ directed oppositely to each other in like manner as the numerals $i, i'$ for facilitating the reading of the vernier scales $b, b'$.

In accordance with the present invention, other graduations $d$ are provided on the peripheral surface of the indicating ring 18 which cooperate with a reference index $c'$ provided on the peripheral surface of the thrust ring 10 at a position corresponding to the reference index $c$.

The pitch of the graduations $d$ is so determined in conjunction with the helical angle of the helical groove 6$b$ of the sleeve 6 that the indicating ring 18 supported on the intermediate ring 14 is rotated by one pitch of the graduations $d$ as the spindle 1 is rotated by one revolution. In other words, the rotation of the indicating ring 18 by one pitch of the graduations $d$ in either of the two directions together with the intermediate ring 14 indicates that the spindle 1 is axially moved by the lead of the lead screw thread of the spindle 1 in either of the two directions depending upon the sense of the rotation of the same.

Two series of successive numerals $k, k'$ are provided along the graduations $d$ directed oppositely from the zero point of the graduations $d$ for facilitating the reading of the graduations $d$ in either of the two directions.

In like manner as the numerals $l, l'$, the numerals $k, k'$ may be expressed by different styles of the letter from each other for facilitating the selection of the numerals $k, k'$ for the reading of the measured value.

It is preferable that the sense of the rotation of the indicating ring 18 is made the same as that of the graduated ring 7 by appropriately setting the helical angle of the helical groove 6$b$ of the sleeve 6, and the numerals for the graduations $a$ and $d$ arranged in the same sense with each other are preferably expressed by the letters similar in style or by the same color with each other.

In the embodiment shown, the numerals $i$ and $k$ are expressed by the similar upright style letters while the numerals $i', k'$ are expressed by the same style letters. In like manner, the numerals $j, j'$ for the vernier scales $b, b'$ may be expressed by the similar upright and inclined style letters, respectively, or may be differently colored from each other so as to facilitate the selective reading of the graduations during the movement of the spindle in either of the two directions.

Figure 4:
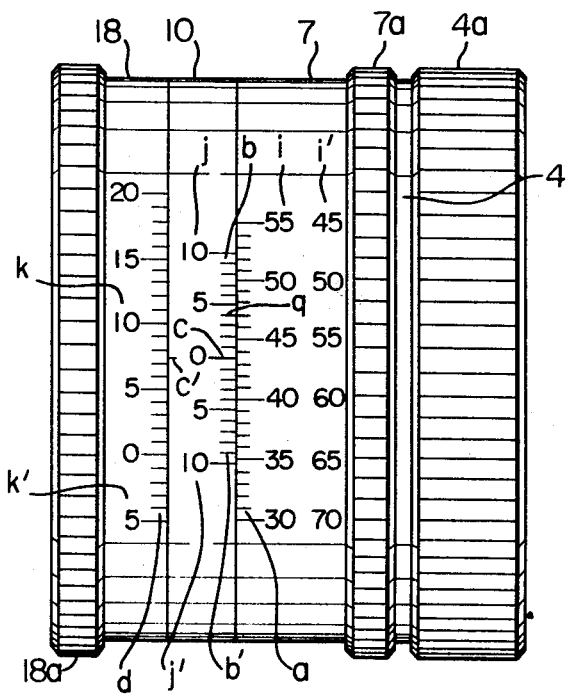

FIGS. 3 and 4 show examples of selective reading the graduations $a$ and $d$ as well as the vernier scales $b, b'$ by the aid of the series of numerals $i, i', k, k'$ and $j, j'$ in cooperation with the reference indexes $c, c'$, respectively.

In FIG. 3, the thimble 4 is shown as being rotated in clockwise direction, for example, together with the spindle (not shown) having right-hand lead screw thread and secured to the thimble 4 in like manner as shown Fig. 1, as seen from the right of FIG. 3, so that the spindle is moved axially in the direction indicated by the arrow A in FIG. 1 i.e., in the direction in which the length to be measured is being decreased.

The amount of the axial movement of the spindle 1 in terms of the multiple of the lead of the lead screw thread of the spindle is indicated by the numeral "−6" in the series $k'$ located oppositely to the reference index $c'$ while the axial movement of the spindle in terms of the fractions of the lead of the lead screw thread of the spindle is indicated by the numerals "−0.52 in the series $i'$ located oppositely to the reference index $c$, the axial movement of the spindle in terms of the fractions of one pitch of the graduations $a$ being indicated by the graduation indicated by "−0.004" of the vernier scale $j'$ which is aligned with one of the graduations $a$ and identified by the reference letter $p$. Thus, the measured value is read as being "−6.524.b"

In like manner, FIG. 4 shows the manner of reading the measure value in which the spindle is rotated in counterclockwise direction as seen from the right of FIG. 4 i.e., the spindle is moved axially in the direction indicated by the arrow B in FIG. 1. The measured value is obtained as being "+7.434" by reading the corresponding numerals in the series $k, i$ and $j$, respectively, the reading of the graduation in the vernier scale $b$ being identified by the reference letter $q$.

When the zero adjustment of the micrometer head is to be effected, it is merely necessary to manually rotate the indicating ring 18 and the graduated ring 7 relative to the thrust ring 10, respectively, while the intermediate ring 14 and the thimble 4 are kept stationarily at any axial position of the spindle in either of the two directions of the axial movement of the spindle 1.

As described above, the zero adjustment of the micrometer head can be easily effected in either of the two directions of the axial movement of the spindle in accordance with the present invention while the reading of the measured value is extremely facilitated by the provision of the pair of series of the numerals along the graduations for the measurement directed oppositely to each other.

Figure 5:
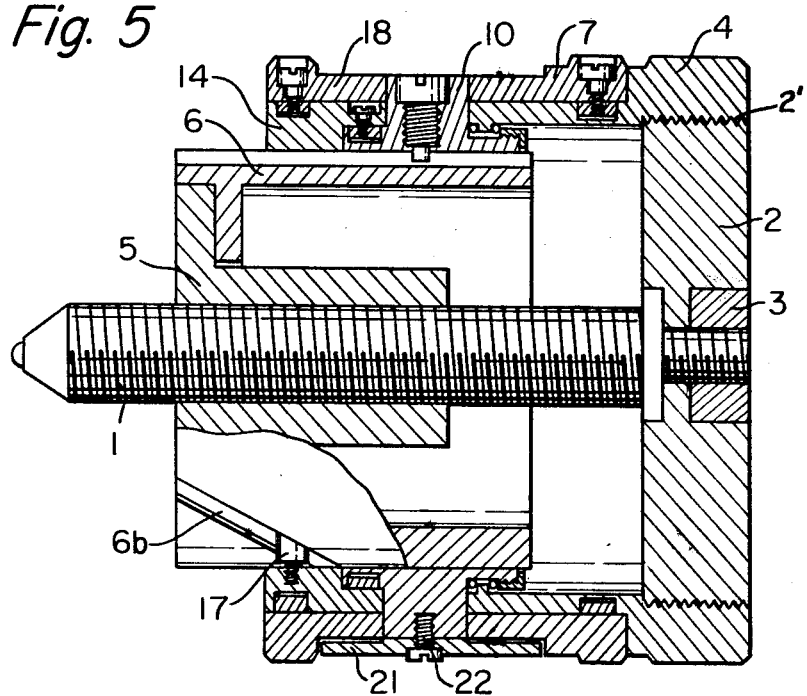
FIG. 5 is a cross-sectional view similar to FIG. 1 but showing a modification of the micrometer head shown in FIG. 1.
Figure 6:
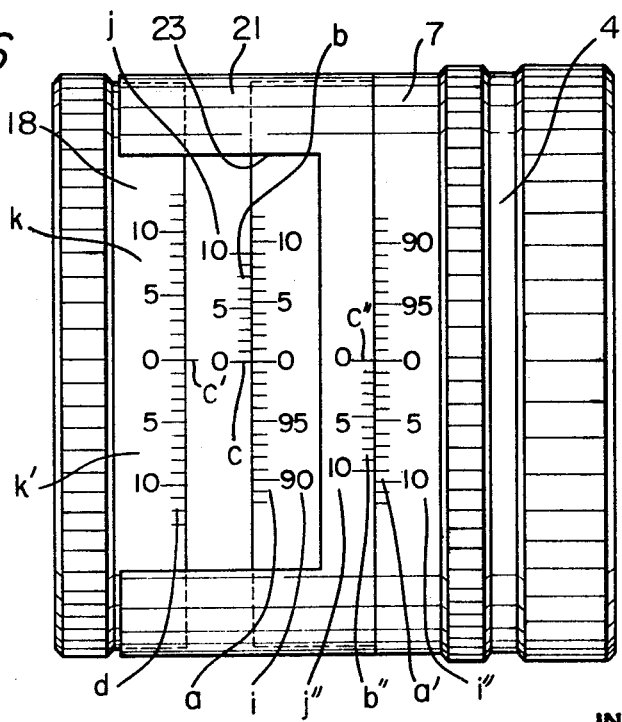
FIG. 6 is a side view similar to FIG. 2 but showing the arrangement of the graduations and the series of the successive numerals provided on the micrometer head of FIG. 5.

FIGS. 5 and 6 show a modification of the micrometer head of the present invention.

The construction of the micrometer head shown in FIGS. 5 and 6 is substantially similar to that shown in FIG. 1. But in this case, a cylindrical cover plate 21 is secured around the thrust ring 10 by means of machine screws 22 and a cutout window 23 is provided in the cover plate 21 so that the graduations $a, b$ and $d$ together with numerals $i, j, k$ and $k'$ are viewed through the cutout window 23 while a further reference index $c''$ is provided on the peripheral end edge of the cover plate 21 at a position corresponding to that of the reference index $c$ with the graduations $b''$ and the numerals $j''$ similar to the graduations $b'$ and the numerals $j'$, respectively, being arranged starting from the reference index $c''$ in the same sense as that of the graduations $b'$. Other graduations $a'$ corresponding to the graduations $a$ are provided on the peripheral surface of the graduated ring 7 in opposing relationship to the reference index $c''$ on the cover plate 21 so as to cooperate therewith. Series of numerals $i''$ corresponding to the numerals $i'$ FIG. 1 are provided along the graduations $a'$.

The operation of the micrometer head shown in FIGS. 5 and 6 is the same as that of the micrometer head of FIG. 1. In this case, however, the selective reading of the numerals $i, i'', j, j''$ is facilitated, because the graduations $a'$ and the reference index $c''$ together with the vernier scale $b''$ having the numerals $j''$ are provided separately from the corresponding graduations and numerals indicated by the reference letters without prime expression for the easy selection of the graduations to be read.

Figure 7:
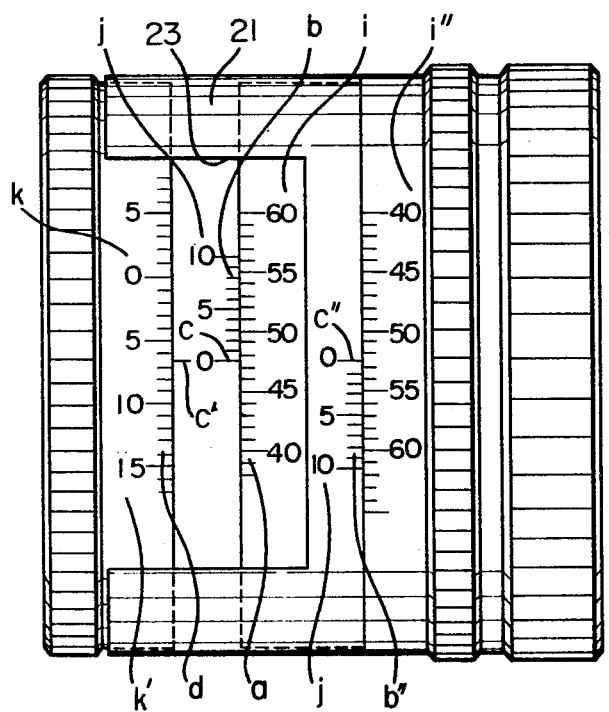
FIG. 7 shows an example of reading the graduations of FIG. 6.

FIG. 7 shows an example of the reading of the measured value by using the micrometer head shown in FIGS. 5 and 6. It is apparent the measured value shown in FIG. 7 is "−6.524."

We claim:

1. A micrometer head having:
   a threaded measuring spindle secured to a thimble and rotatably threaded in a sleeve held fixedly to the micrometer head so as to detect the axial movement of said spindle by the rotative movement thereof,
   a graduated ring rotatable together with said thimble relative to said sleeve and bearing circumferential graduations having a starting zero point thereof on the peripheral surface of said graduated ring for indicating the rotative position of said spindle in terms of fractions of one revolution thereof and, hence, in terms of the fractions of the lead of the thread of said spindle in cooperation with a reference index provided in the micrometer head rotatably fixed with respect to said sleeve,
   wherein the improvement comprises the fact that said graduated ring is mounted on said thimble rotatably relative thereto so as to permit the zero adjustment of said starting zero point of said graduations on said graduated ring with respect to said reference index to be effected at any axial position of said spindle in either sense of the two directions of the axial movement of said spindle while said graduated ring is rotatable together with said thimble during the normal measuring operation of the micrometer head, an indicating ring being provided on said sleeve relatively rotatable with respect thereto and having thereon circumferential graduations having a starting zero point thereof cooperating with a reference index held rotatably fixed with respect to said sleeve, said indicating ring being operatively coupled with said spindle such that the former is rotatably moved by one pitch of said graduations thereon during one complete revolution of said spindle thereby permitting the axial movement by the lead of the thread of said spindle by virtue of one revolution thereof to be indicated by the rotative movement of said indicating ring by one pitch of said graduations thereon, said indicating ring being further manually rotatable relative to said sleeve while said spindle is held stationary with respect to said sleeve thereby permitting the zero adjustment of said starting zero point of said graduations on said indicating ring with respect to said reference index cooperating therewith to be effected at any axial position of said spindle in either sense of the two directions of the axial movement of said spindle while said indicating ring is rotatable in coupled relationship with the rotational movement and, hence, the axial movement of said spindle during the normal measuring operation of the micrometer head, said graduated ring being rotatably mounted on said thimble while the axial movement relative thereto is restrained, said reference index cooperating with said graduations on said graduated ring being provided on a thrust ring axially movably mounted on said sleeve while the rotative movement thereof relative to said sleeve is restrained, said thrust ring being so coupled with said thimble by engaging means provided therebetween that the former is axially moved together with the latter while the relative rotative movement therebetween is permitted, an intermediate ring being relatively rotatably interposed between said indicating ring and said sleeve and engaged with said thrust ring by engaging means provided therebetween so that said intermediate ring is moved axially together with said thrust ring while the relative rotative movement between said intermediate ring and said thrust ring is permitted, said intermediate ring being so coupled with said sleeve by helical guide means provided therebetween that the former supporting thereon said indicating ring is rotatably moved by one pitch of said graduations on said indicating ring in response to one complete revolution of said spindle and, hence, to the axial movement of said spindle by the lead of the thread thereof thereby permitting said indicating ring supported on said intermediate ring to be rotatably moved by one pitch of said graduations thereon so as to indicate the axial movement of said spindle by the lead of the thread thereof, said indicating ring being manually rotatable relative to said intermediate ring for the zero adjustment of said starting zero point of said graduations on said indicating ring with respect to said reference index cooperating therewith which is provided on said thrust ring while said indicating ring is rotatably moved together with said intermediate ring during the normal measuring operation of the micrometer head.

2. A micrometer head according to claim 1, wherein two vernier scales are provided on said thrust ring in opposite senses to each other in parallel to said graduations on said graduated ring in facing relationship thereto with the zero point of each of said two vernier scales being positioned in coincidence with said reference index cooperating with said graduations on said graduated ring.

3. A micrometer head according to claim 1, wherein an annular cover plate is secured around the peripheral surface of said thrust ring with a cutout window formed therein so as to expose said reference index on said thrust ring as well as said graduations on said graduated ring, the peripheral edge of said annular cover plate bearing thereon a further reference index at an rotative position corresponding to those on said thrust ring, further graduations corresponding to said graduations on said thrust ring being provided on the peripheral surface of said thrust ring at positions along said peripheral edge of said annular cover plate so as to cooperate with said further reference index on said annular cover plate, said first series of the numerals on said thrust ring being arranged along said graduations facing to said reference index on said thrust ring while said second series of the numerals on said graduated ring being arranged along said further graduations facing to said further reference index on said annular cover plate thereby permitting the selective reading of said series of the numerals to be facilitated for the measurement in either sense of the two directions of the movement of said spindle by which the same has been moved from said starting zero point.

4. A micrometer head according to claim 3, wherein a vernier scale is provided at said reference index cooperating with said graduations on said graduated ring, while another vernier scale is provided at said further reference index cooperating with said further graduations on said graduated ring, said another vernier scale being directed on the opposite sense to said one vernier scale.